(12) United States Patent
Cohen et al.

(10) Patent No.: US 7,877,701 B2
(45) Date of Patent: Jan. 25, 2011

(54) IN-CONTEXT TOTAL DOCUMENT VIEWS FOR MANIPULATING DATA

(75) Inventors: Gabriel A. Cohen, San Mateo, CA (US); Vijay Dheap, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 765 days.

(21) Appl. No.: 11/683,486

(22) Filed: Mar. 8, 2007

(65) Prior Publication Data

US 2008/0222548 A1    Sep. 11, 2008

(51) Int. Cl.
*G06F 3/048* (2006.01)
(52) U.S. Cl. .................................. 715/770; 715/769
(58) Field of Classification Search ............... 715/770
See application file for complete search history.

(56) References Cited

U.S. PATENT DOCUMENTS

| | | | |
|---|---|---|---|
| 6,177,939 B1 * | 1/2001 | Blish et al. | 715/770 |
| 7,293,242 B2 * | 11/2007 | Cossey et al. | 715/770 |
| 2002/0067380 A1 | 6/2002 | Graham | |
| 2005/0172241 A1 * | 8/2005 | Daniels et al. | 715/770 |
| 2005/0183031 A1 * | 8/2005 | Onslow | 715/805 |
| 2006/0136836 A1 | 6/2006 | Clee et al. | |
| 2006/0277482 A1 * | 12/2006 | Hoffman et al. | 715/764 |
| 2007/0266333 A1 * | 11/2007 | Cossey et al. | 715/769 |
| 2009/0044140 A1 * | 2/2009 | Chen et al. | 715/770 |

\* cited by examiner

*Primary Examiner*—William L Bashore
*Assistant Examiner*—Ashraf Zahr
(74) *Attorney, Agent, or Firm*—Law Office of Jim Boice

(57) ABSTRACT

A computer-implementable method, system and computer-readable medium for providing in-context total document views for manipulating data are presented. In one embodiment, the method includes the steps of: displaying an active context of a software program on a User Interface (UI); receiving a copy command for a copied element from the active context; in response to a control signal, displaying an access view of one or more secondary contexts of the software program; temporarily activating a selected context from the secondary contexts shown in the access view while continuing to display the active context on the UI; and pasting the copied element into the selected context. Preferably, in response to the copied element being pasted into the selected secondary context, the access view is automatically removed from the UI.

8 Claims, 6 Drawing Sheets

IN-CONTEXT TOTAL DOCUMENT VIEWS FOR MANIPULATING DATA

BACKGROUND OF THE INVENTION

The present invention relates in general to the field of computers and similar technologies, and in particular to software utilized in this field. Still more particularly, the present disclosure relates to manipulating data between sections of a document or similar software sub-context.

Today, users commonly have to manipulate and navigate large documents, such as text documents, slide shows, workflows, Computer Aided Design (CAD) diagrams, etc. Limitations in screen real estate make it both difficult to keep a narrow enough view of the data to make detailed changes, while still providing a broad enough view to understand the context of the current working page (in the whole document structure). For example, consider a lengthy text document that has been created through the use of a word processing application. If a user desires to cut/copy and paste words from a current page to another page, the user must typically cut/copy the words, scroll or jump to another page, paste in the cut/copied words, and then return to the original current page (assuming that he/she can remember where that page was). This technique is time consuming and error-prone.

SUMMARY OF THE INVENTION

To address the problem described above, presently disclosed are a computer-implementable method, system and computer-usable medium for providing in-context total document views for manipulating data. In one embodiment, the method includes the steps of: displaying an active primary context of a software program on a User Interface (UI); receiving a command to perform an editing operation for an element from the active primary context; in response to a control signal, displaying an access view of one or more secondary contexts of the software program; temporarily activating a selected context from the secondary contexts shown in the access view while continuing to display at least a portion of the active primary context on the UI; and completing the editing operation of the element into the selected context. Preferably, in response to the editing operation being completed, the access view is automatically removed from the UI.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
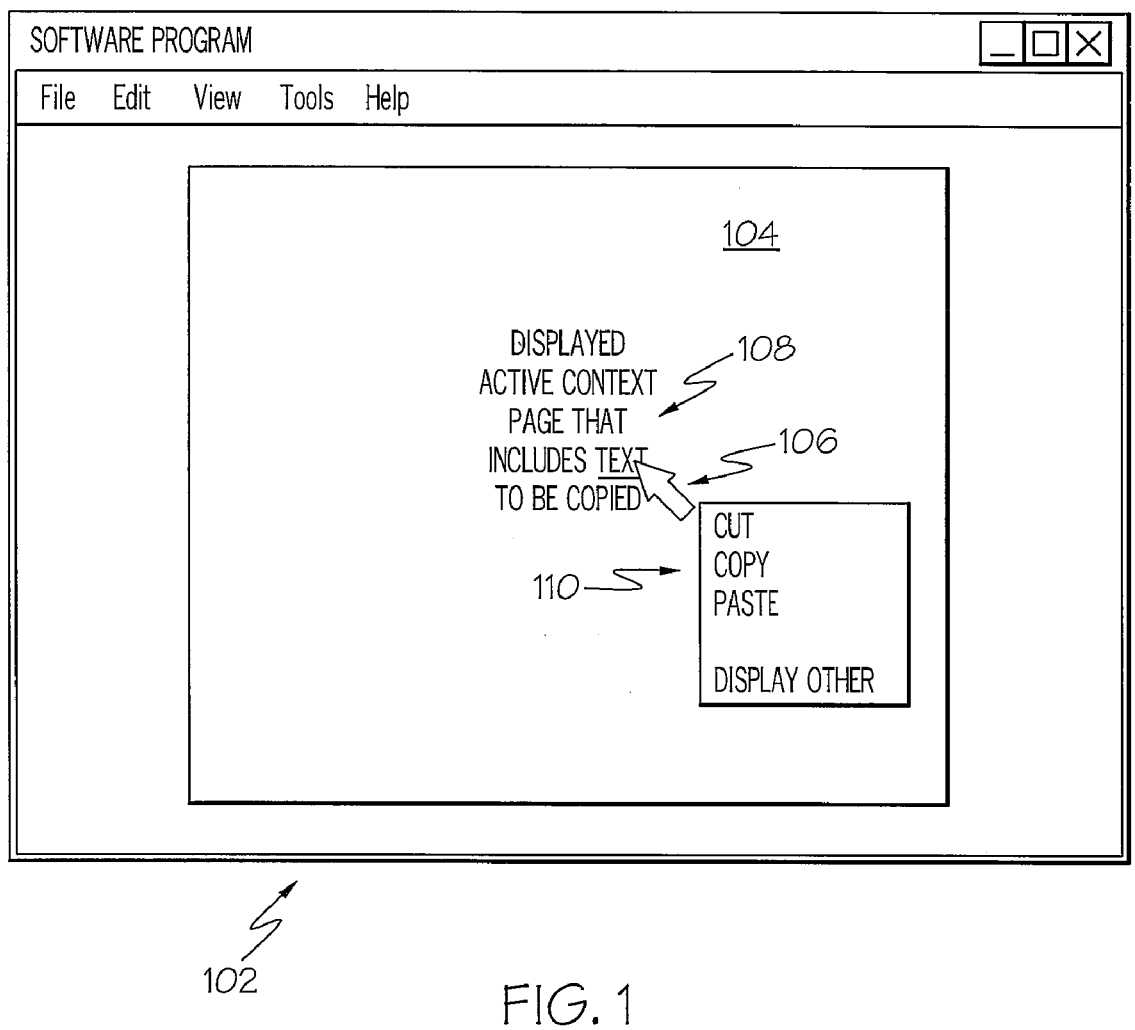
FIG. 1 depicts a User Interface (UI) of exemplary text, in a page of a document, that needs to be edited into another page in the document.

Referring now to FIG. 1, a user interface (UI) 102 is presented. Within UI 102 is an active context 104. Active context 104 may be a currently displayed page of a word processing document, a currently displayed slide in a slide presentation, or any other context page in which the content can be edited directly in the UI 102. For example, after using a cursor 106 to highlight a selected area shown as text 108, a pop-up command window 110 may appear, showing user-selectable commands such as cut, copy, paste, etc. Furthermore, pop-up command window 110 includes a "Display other" command. After highlighting the text 108 and initiating the copy command, the user can click the "Display other" command, which results in an access view to appear in UI 102, such as shown in FIG. 2.

Figure 2:
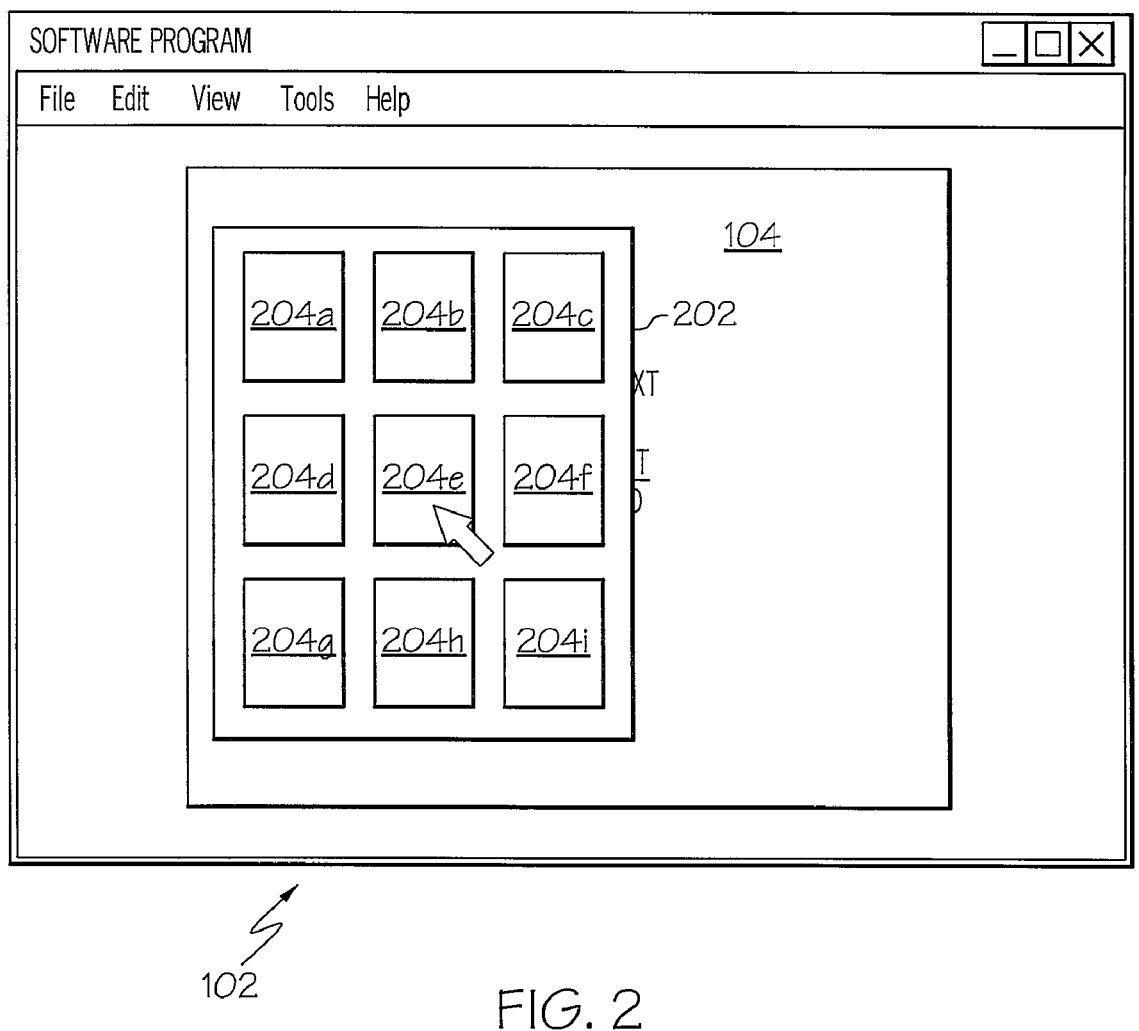
FIG. 2 illustrates a pop-up access view showing other pages in the document.

Referring then to FIG. 2, a pop-up access view 202 has now appeared in UI 102. Pop-up access view 202 is populated with multiple secondary contexts 204a-i. Each secondary context 204 represents an inactive page, screen, or other subdivision of a file that is running under a single software program. For example, if the software program running is word processing program, then each secondary context 204 may be a document page that is not currently being displayed on the UI 102 (i.e., as active context 104), and thus cannot be edited (since it is not normally visible to the user). However, by clicking a selected secondary context 204, such as secondary context 204e, then the selected secondary context 204 temporarily becomes active, such that a copied element (i.e., a string of characters such as text 108) can be pasted into the selected secondary context 204e.

Figure 3:
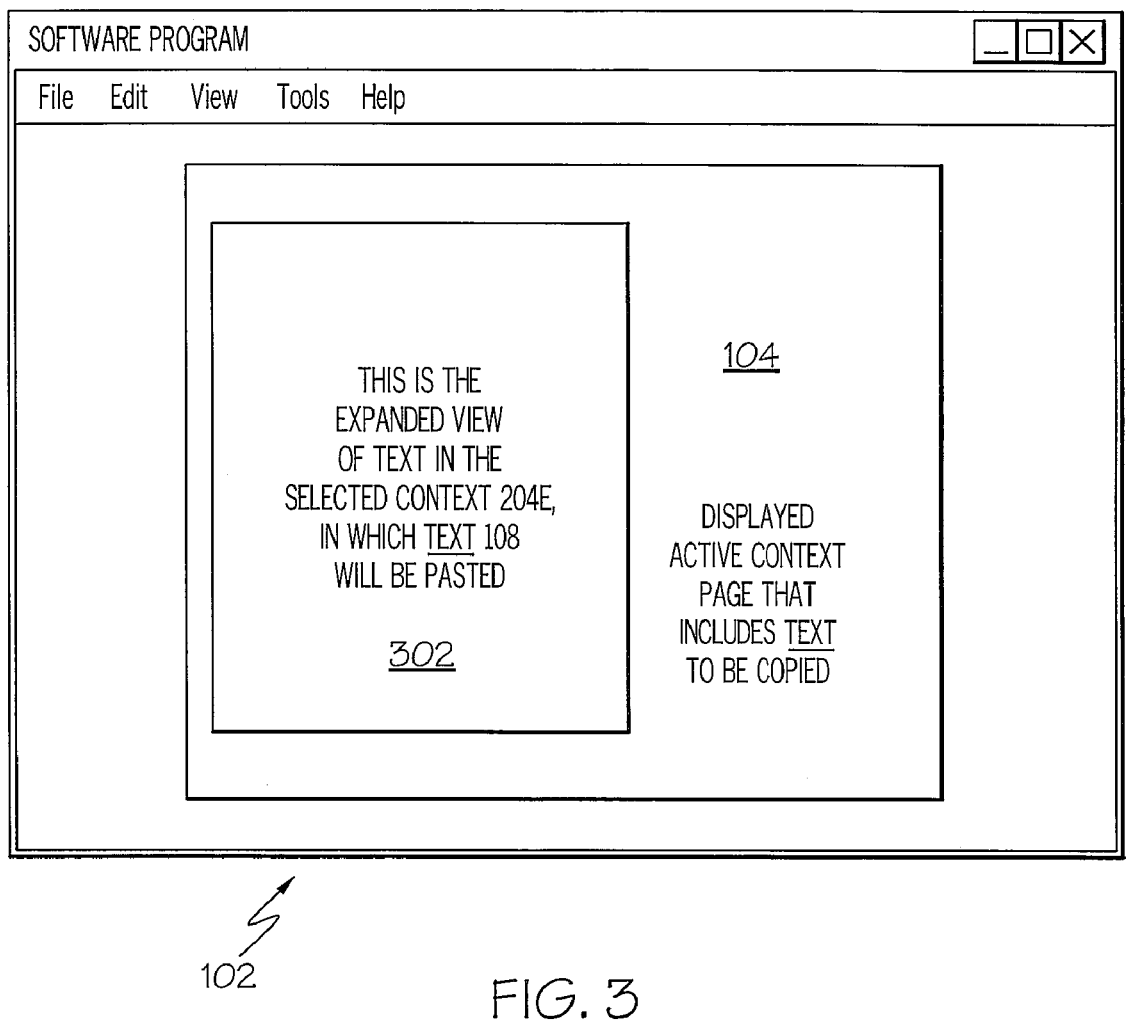
FIG. 3 depicts a zoomed (enlarged) view of a selected page from the pop-up access view.

When presented in a manner shown in FIG. 2, secondary context 204e cannot initially receive a copied element for pasting. For example, secondary context 204e may be nothing but a title for a page, a leaf on a navigation tree, etc., and thus there is no way for the user to be able to paste the copied element into a meaningful location on the secondary context 204e. Similarly, secondary context may be a miniature depiction of an entire page, which does not allow adequate image resolution for the user to paste the copied element, even if the secondary context 204e were to be activated. Thus, to facilitate the pasting of the copied element by the user, the secondary context is expanded (i.e., displayed and/or zoomed), as shown in FIG. 3. Expanded view 302 is an expanded view of the selected secondary context 204e. A user is now able to paste the copied element into the expanded view 302 of the selected secondary context 204e. Note that in FIG. 3, the expanded page (expanded view 302) for the selected secondary context 204e is depicted as being displayed in a tiled manner on the UI 102, such that a user is able to see that the content of the original active context 104 remains unchanged. Alternatively, the page for the selected secondary context 204e may be displayed in a full screen mode over the original active context 104. In either scenario, the original active context 104 is in an inactive state while the selected secondary context 204e is temporarily activated.

Once the copied element is pasted into the selected secondary context 204e, the expanded view 302, as well as the pop-up access view 202 automatically disappear from the UI 102, leaving the UI 102 appearing as initially shown in FIG. 1, in which only the active context 104 (showing the original page from which the text was copied) is displayed.

Figure 4:
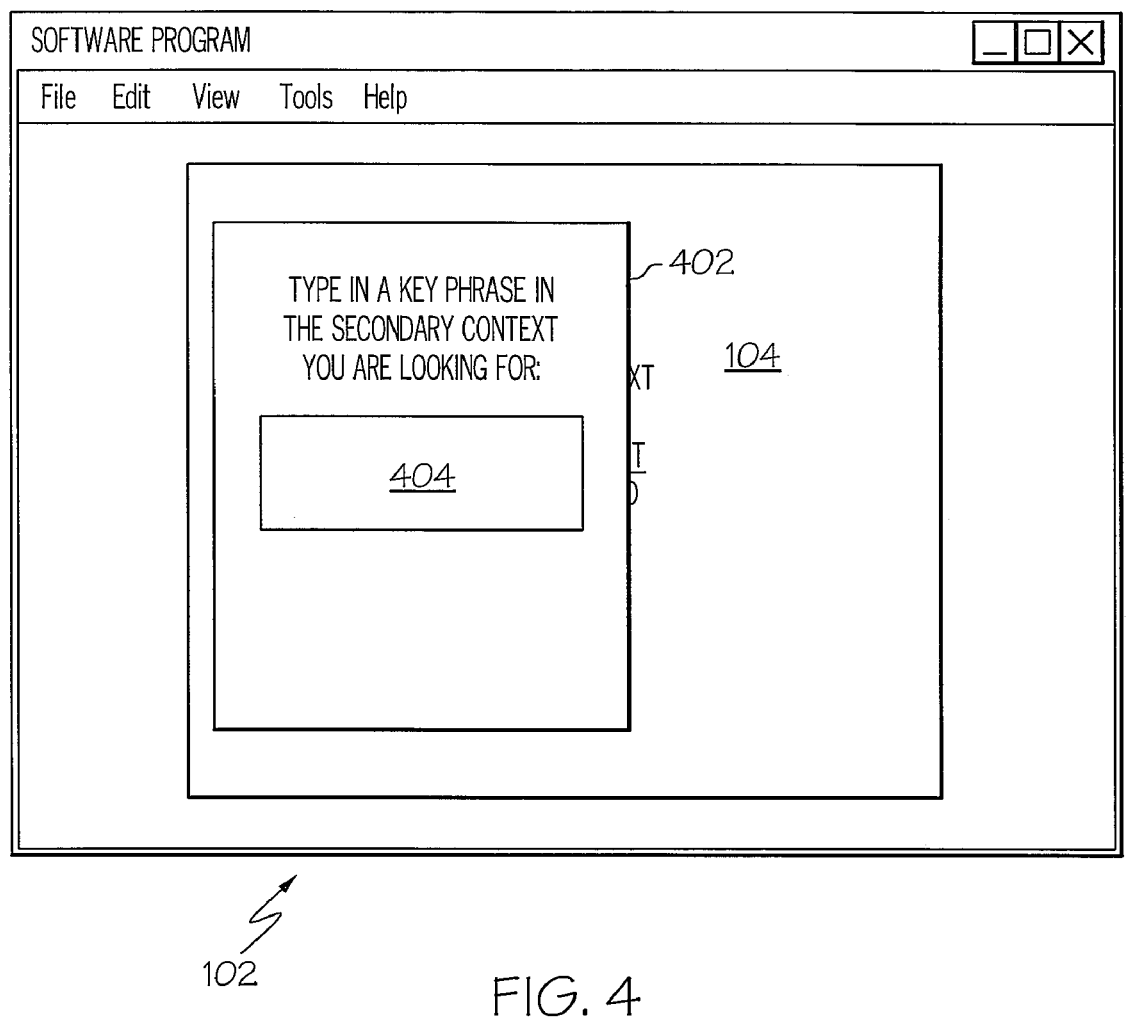
FIG. 4 illustrates an alternative pop-up access view that presents a search tool for locating another page in the document.

Referring now to FIG. 4, an alternate pop-up access window is shown. That is, rather than presenting a graphical representation of all secondary contexts (such as pop-up access view 202 shown in FIG. 2), a search tool window 402 can be popped up in response to a control signal (e.g., clicking the "Display other" option in the pop-up command window 110 shown in FIG. 1). Thus, a user may enter a search query into a search query window 404. This search query may be based on a string of characters to be searched, a passage having a similar meaning, etc. After entering this search query information, secondary context (e.g., pages in the document that match the search query) pops-up in a manner similar to that described in FIG. 3. After the copied information is edited (e.g., pasted) into the popped-up secondary context, that secondary context, as well as the search tool window 402, automatically disappear from view in the UI 102.

Figure 5:
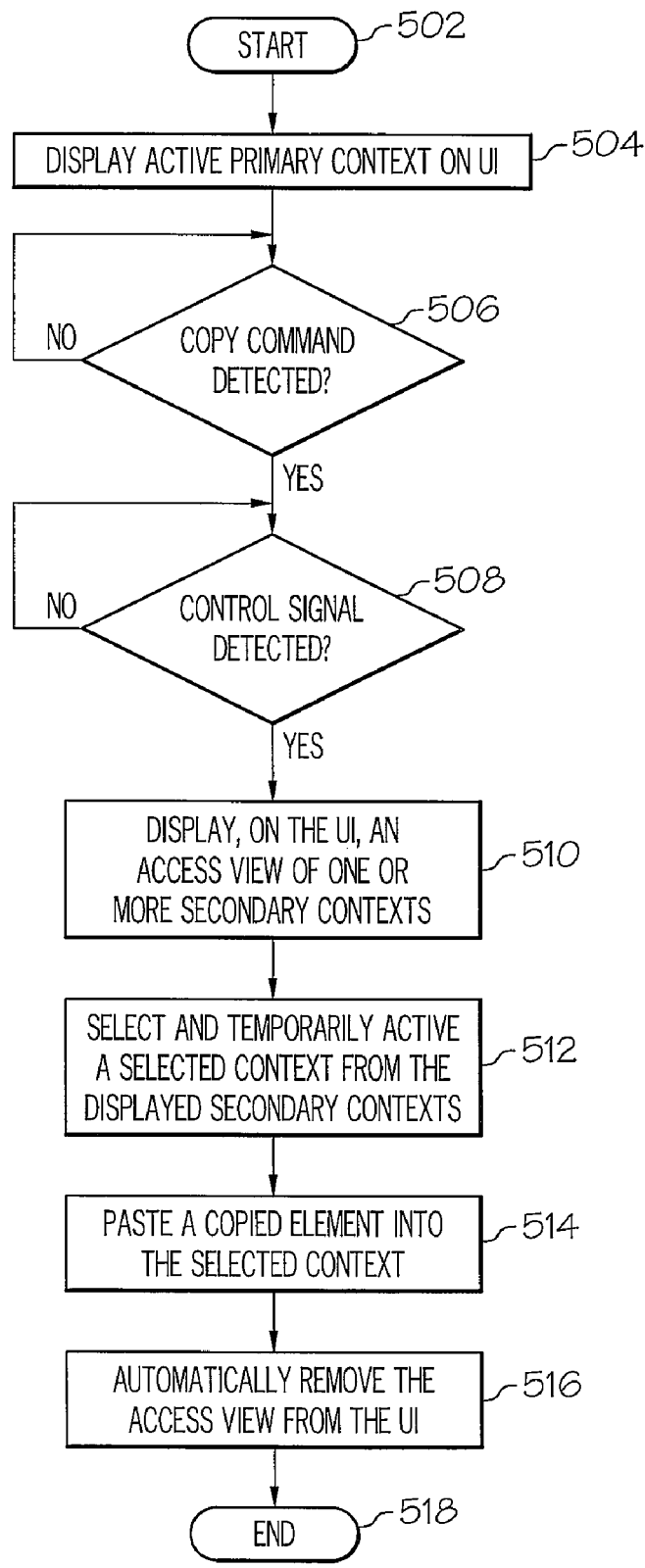
FIG. 5 is a flow-chart of exemplary steps taken to edit an element from a currently active primary context (e.g., a current page in a document) to a secondary context (e.g., another page in the document) that is selected from the pop-up access view.

Referring now to FIG. 5, a flow-chart of exemplary steps taken to temporarily activate and display secondary contexts for pasting copied objects is described. After initiator block 502, an active context (i.e., a page in a document, a slide in a slide show, a drawing page in a CAD file, etc.) is displayed on a UI (block 504). If a "copy" command (query block 506) and a control signal (query block 508) are detected, then an access view of multiple secondary contexts (e.g., other pages in the document) is displayed (block 510).

One of the secondary contexts is then selected (block 512). As described above, there are many ways to select an secondary context. For example, an secondary context may be selected by clicking an icon (i.e., a title icon, a miniature depiction, etc.) for the secondary context. Alternatively, the secondary context may be selected through the use of a search tool as described in FIG. 4. In another alternative embodiment, the secondary context may be heuristically selected. That is, a program can intelligently decide to display an secondary context that has a history of having been pasted to, or that has a same or similar character string as that of or near the copied element.

The copied element is then pasted into the selected secondary context (block 514). As described above, the selected secondary context may first be expanded (displayed, zoomed, etc.) before the paste operation is performed. In a preferred embodiment, once the pasting operation occurs, the access view (as well as the expanded view of the secondary context) automatically disappears from the UI (block 516), and the process ends (terminator block 518).

Figure 6:
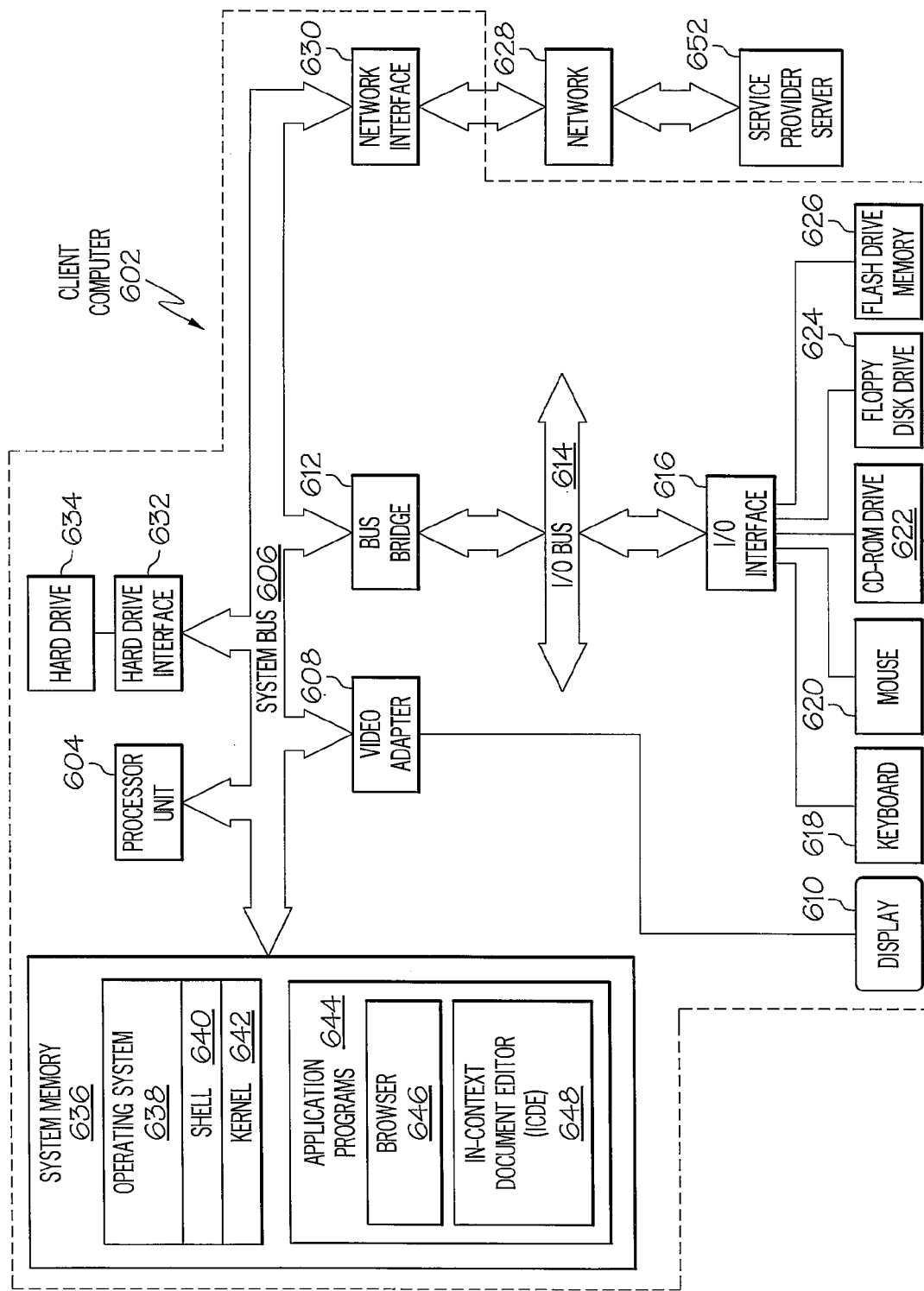
FIG. 6 depicts an exemplary computer in which the present invention may be implemented.

With reference now to FIG. 6, there is depicted a block diagram of an exemplary client computer 602, in which the present invention may be utilized. Client computer 602 includes a processor unit 604 that is coupled to a system bus 606. A video adapter 608, which drives/supports a display 610, is also coupled to system bus 606. System bus 606 is coupled via a bus bridge 612 to an Input/Output (I/O) bus 614. An I/O interface 616 is coupled to I/O bus 614. I/O interface 616 affords communication with various I/O devices, including a keyboard 618, a mouse 620, a Compact Disk-Read Only Memory (CD-ROM) drive 622, a floppy disk drive 624, and a flash drive memory 626. The format of the ports connected to I/O interface 616 may be any known to those skilled in the art of computer architecture, including but not limited to Universal Serial Bus (USB) ports.

Client computer 602 is able to communicate with a service provider server 652 via a network 628 using a network interface 630, which is coupled to system bus 606. Network 628 may be an external network such as the Internet, or an internal network such as an Ethernet or a Virtual Private Network (VPN). Service provider server 652 may utilize a similar architecture design as that described for client computer 602.

A hard drive interface 632 is also coupled to system bus 606. Hard drive interface 632 interfaces with a hard drive 634. In a preferred embodiment, hard drive 634 populates a system memory 636, which is also coupled to system bus 606. Data that populates system memory 636 includes client computer 602's operating system (OS) 638 and application programs 644.

OS 638 includes a shell 640, for providing transparent user access to resources such as application programs 644. Generally, shell 640 is a program that provides an interpreter and an interface between the user and the operating system. More specifically, shell 640 executes commands that are entered into a command line user interface or from a file. Thus, shell 640 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 642) for processing. Note that while shell 640 is a text-based, line-oriented user interface, the present invention will equally well support other user interface modes, such as graphical, voice, gestural, etc.

As depicted, OS 638 also includes kernel 642, which includes lower levels of functionality for OS 638, including providing essential services required by other parts of OS 638 and application programs 644, including memory management, process and task management, disk management, and mouse and keyboard management.

Application programs 644 include a browser 646. Browser 646 includes program modules and instructions enabling a World Wide Web (WWW) client (i.e., client computer 602) to send and receive network messages to the Internet using HyperText Transfer Protocol (HTTP) messaging, thus enabling communication with service provider server 652.

Application programs 644 in client computer 602's system memory also include an In-Context Document Editor (ICDE) 648, which includes logic for implementing the steps and UI's described above in FIGS. 1-5. In a preferred embodiment, service provider server 652 also has a copy of ICDE 648, which may be executed by or downloaded from service provider server 652, as described below. In one embodiment, client computer 602 is able to download ICDE 648 from service provider server 652.

The hardware elements depicted in client computer 602 are not intended to be exhaustive, but rather are representative to highlight essential components required by the present invention. For instance, client computer 602 may include alternate memory storage devices such as magnetic cassettes, Digital Versatile Disks (DVDs), Bernoulli cartridges, and the like. These and other variations are intended to be within the spirit and scope of the present invention.

As noted above, ICDE 648 can be downloaded to client computer 602 from service provider server 652. This deployment may be performed in an "on demand" basis manner, in which ICDE 648 is only deployed when needed by client computer 602. Note further that, in another preferred embodiment of the present invention, service provider server 652 performs all of the functions associated with the present invention (including execution of ICDE 648), thus freeing client computer 602 from using its resources. In another embodiment, process software for the method so described may be deployed to service provider server 652 by another service provider server (not shown). In yet another embodiment, ICEE 648 may be implemented through the use of a browser based application such as a Rich Internet Application (RIA). This RIA may be implemented in browser 646, preferably through the use of JavaScript such as AJAX (Asynchronous JavaScript using XML).

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Thus, presently disclosed are a computer-implementable method, system and computer-readable medium for providing in-context total document views for manipulating data. In one embodiment, the method includes the steps of: displaying an active context of a software program on a User Interface (UI); receiving a copy command for a copied element from the active context; in response to a control signal, displaying an access view of one or more secondary contexts of the software program; temporarily activating a selected context from the secondary contexts shown in the access view while continuing to display the active context on the UI; and pasting the copied element into the selected context. Preferably, in response to the copied element being pasted into the selected secondary context, the access view is automatically removed from the UI. Alternatively, the access view may be persistently displayed in a user-determined area of the UI. In one embodiment, the access view comprises miniature views of the one or more secondary contexts of the software program, and the miniature views may be expanded (zoomed) to allow higher resolution for positioning of the copied element into the selected secondary context. In another embodiment, the access view comprises a tree diagram of the one or more secondary contexts. In another embodiment, the access view comprises a search tool to locate a specifically-described secondary context. In another embodiment, the method further includes the steps of: heuristically determining which secondary context is likely to be the selected context in accordance with a history of previous selections of secondary contexts; and automatically presenting a heuristically determined context as the selected context. If the software program is a word processing application, then the active context is a document page that is currently being displayed on the UI, the secondary contexts are document pages that are not being currently displayed on the UI, and the copied element is a string of characters. If the software program is a Computer Aided Design (CAD) program, then the active context may be a graphical drawing page that is currently being displayed on the UI, the secondary contexts are graphical drawing pages that are not being currently displayed on the UI, and the copied element is an icon representing a design element.

More specifically, presently disclosed is the use of an in-context (pop-up, tiled, etc.) view of the total document, (or a larger portion of the document) to be triggered when performing a variety of tasks which require access to detail, but span a large document. This context view supports the features of:

A total or partial document view which is either a zoomed out view or an outline;

A view that can become a non modal window for extended interaction, or dock and become a traditional sidebar view;

The ability to move the focus for a partial document view by interacting directly with the context view;

The ability to zoom in and out (or the tree equivalent) in the context view;

The ability to edit (e.g., drag/drop) from the original view into the context view (thereby moving data quickly across the entire document) (or vice versa);

The ability to edit (e.g., copy/cut/paste) from the original view into the context view (or vice versa);

The ability to reorder or reposition objects in the context view;

Automatic destruction of the view (unless otherwise specified) upon completing a simple operation as described above; and Offsetting the placement of the view from the current mouse/cursor position slightly to avoid obscuring that area as a data target or source.

Note that the presently disclosed system is novel and superior to prior art split-screen solutions in that the broad view (e.g., the zoomed view of the context selected from the access view) is hidden until needed, and is extremely fast to bring up. Furthermore, the broad view is brought up directly in the area of the current work within the narrow document view, so little mouse motion is required. Note also that this zoomed view can be discarded quickly when an operation is complete.

Note also that the presently disclosed method and system are not extensions of a docked outline view due to the added utility provided in creating the zoomed view in the middle of another operation, and the automation of the destruction of the view upon completing the operation, neither of which is present in a standard Integrated Development Environment (IDE).

When utilized with a CAD tool, a user may wish to copy a widget into another portion of a diagram which is many screens of scrolling away from the current view. Utilizing the presently disclosed method and system, a user can select an original widget, activate some type of pre-defined control signal (e.g., CTRL-C's to copy it to the clip board), then hits a key/mouse trigger to bring up the in-place document view. After zooming (if necessary) the selected document view, the user can then move the cursor to another area of the pulled-up document, and then hit the paste key sequence. The context view (for the pulled-up page) then automatically disappears, and the user is able to resume work in the original location. Note that this only involves one input sequence beyond a copy paste in the narrow document area, and little mouse movement.

In a presentation authoring tool, such as a word processing program or a slide show generator, a user may wish to insert a graph from a later slide into the current slide. The user is currently in the space where the image is to be placed. The user hits a key/mouse sequence to popup the contextual document view. A slide sorting view of all or a selected range (e.g., the 5 previous and 5 subsequent slides) of slides appears. The user selects the chart from the thumbnail view of the slide (e.g., a slide that is three slides ahead of the currently active slide), and drags it back into the original view in the editor. As the drag cursor exits the slide sorting view, the viewer hides itself. The user drops the object into the target position in the current chart. Note that this only involves one input sequence beyond a drag and drop in the narrow document area, and little mouse movement.

Note that a user can make more than one editing action between the active primary context and the secondary context through the use of alternate control sequences. For example, using a first control sequence may allow a user to copy/paste content, while another control sequence will allow the user to cut/paste content.

While the present invention has been particularly shown and described with reference to a preferred embodiment, it will be understood by those skilled in the art that various changes in form and detail may be made therein without departing from the spirit and scope of the invention. For example, while the term "copy" is used in the claims to describe copying a string of text from a first document, the term is understood to be defined as including all similar such commands, including "cut," "move," etc. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implementable method comprising:
    displaying an active context of a software program on a User Interface (UI);
    receiving a copy command for a copied element from the active context;
    in response to a control signal, displaying an access view of one or more secondary contexts of the software program, wherein said one or more secondary contexts are initially inactive, wherein the access view comprises miniature views of the one or more secondary contexts of the software program, wherein each of the miniature views presents a miniature depiction of an entire document page, wherein the miniature views do not allow adequate image resolution for a user to paste the copied element, and wherein each of the miniature views are expandable to allow higher resolution for positioning of the copied element for pasting into a selected secondary context when activated;
    temporarily activating a selected context from said one or more secondary contexts shown in the access view, wherein activating the selected context further causes one of the miniature views to be expanded into an expanded view of the entire document page; and
    pasting the copied element into the expanded view of the entire document page.

2. The computer-implementable method of claim 1, further comprising:
    in response to the copied element being pasted into the selected secondary context, automatically removing the access view from the UI.

3. The computer-implementable method of claim 1, further comprising:
    heuristically determining which secondary context is likely to be the selected context in accordance with a history of previous selections of secondary contexts; and
    automatically presenting a heuristically determined context as the selected context.

4. The computer-implementable method of claim 1, further comprising:
    persistently displaying the access view to a user-determined area of the UI.

5. A system comprising:
    a processor;
    a data bus coupled to the processor;
    a memory coupled to the data bus; and
    a computer-usable medium embodying computer program code, the computer program code comprising instructions executable by the processor and configured for:
    displaying an active primary context of a software program on a User Interface (UI);
    receiving a command to perform an editing operation for an element from the active primary context;
    in response to a control signal, displaying an access view of one or more secondary contexts of the software program, wherein said one or more secondary contexts are initially inactive, wherein the access view comprises miniature views of the one or more secondary contexts of the software program, wherein each of the miniature views depicts a miniature depiction of an entire document page, wherein a miniature view does not allow adequate image resolution for a user to edit the miniature depiction, and wherein the miniature views are expandable to allow higher resolution for editing a portion of the entire document page when activated;
    temporarily activating a selected context from said one or more secondary contexts shown in the access view while continuing to display at least a portion of the active primary context on the UI, wherein activating the selected context further causes one of the miniature views to be expanded into an expanded view of the entire document page; and
    completing the editing operation of the element in the expanded view of the entire document page.

6. The system of claim 5, wherein the instructions are further configured for:
    in response to the editing operation being completed, automatically removing the access view from the UI.

7. A computer program product comprising:
    a computer-usable medium embodying computer program code, the computer program code comprising instructions executable by the processor and configured for:
    displaying an active primary context of a software program on a User Interface (UI);
    receiving a command to perform an editing operation for an element from the active primary context;
    in response to a control signal, displaying an access view of one or more secondary contexts of the software program, wherein said one or more secondary contexts are initially inactive, wherein the access view comprises miniature views of the one or more secondary contexts of the software program, wherein each of the miniature views depicts a miniature depiction of an entire document page, wherein a miniature view does not allow adequate image resolution for a user to edit the miniature depiction, and wherein the miniature views are expandable to allow higher resolution for editing a portion of the entire document page when activated;
    temporarily activating a selected context from said one or more secondary contexts shown in the access view while continuing to display at least a portion of the active primary context on the UI, wherein activating the selected context further causes one of the miniature views to be expanded into an expanded view of the entire document page; and completing the editing operation of the element in the expanded view of the entire document page.

8. The computer program product of claim 7, wherein the instructions are further configured for:

in response to the editing operation being completed, automatically removing the access view from the UI.

* * * * *